Figure 1A:
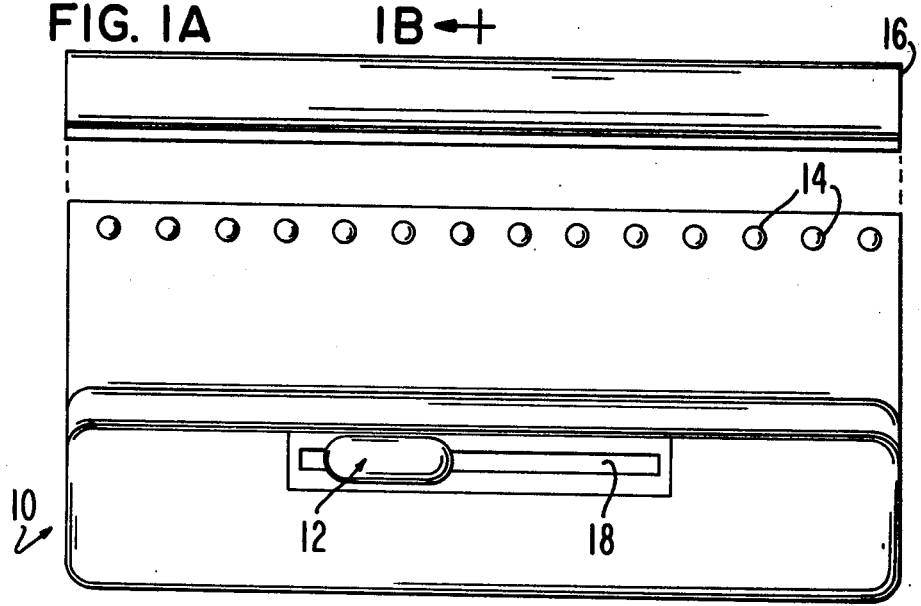

United States Patent [19]

Spong

[11] Patent Number: 4,457,720
[45] Date of Patent: Jul. 3, 1984

[54] READING PACER

[75] Inventor: Gary W. Spong, Vallejo, Calif.

[73] Assignee: Banatron Research Corp., Inc., San Jose, Calif.

[21] Appl. No.: 401,072

[22] Filed: Jul. 23, 1982

[51] Int. Cl.³ .............................................. G09B 17/04
[52] U.S. Cl. .................................................. 434/179
[58] Field of Search .............. 434/178, 179, 180, 183; 40/518

[56] References Cited

U.S. PATENT DOCUMENTS

| | | | |
|---|---|---|---|
| 36,242 | 8/1862 | Snyder | 434/178 |
| 3,392,463 | 7/1968 | Hachigian | 434/178 |
| 3,747,246 | 7/1973 | Sarier et al. | 40/518 |

Primary Examiner—William H. Grieb
Attorney, Agent, or Firm—David Pressman

[57] ABSTRACT

A machine for pacing reading speed to improve same comprises a housing (10) having a top edge which contains a row of lamps (14). The edge is placed under a line of print and the lamps are caused to be illuminated in sequence from left to right to guide and pace the reader's eye. In a manual version (FIG. 1) the lamps are illuminated by repetitively moving a slide switch (12). In an electronic version (FIG. 3) the lamps are illuminated in sequence by the output of an electronic circuit (FIG. 3B). The speed of sequencing and the number of lamps illuminated can be controlled for differing reading speeds and printed line widths respectively (P1 and S1).

4 Claims, 9 Drawing Figures

READING PACER

BACKGROUND

1. Field of Invention

This invention relates to reading improvement, particularly to a machine for pacing reading speed via mechanical or electronic means in order to effect improvement in reading speed and facility.

2. Description of Prior Art

Heretofore various devices have been proposed to test and improve reading speed and ability. One such device comprised a tachistoscope, i.e., a device for projecting transient images onto a screen to test or improve visual acuity. While this and similar devices are somewhat effective, they required awkward and expensive projection equipment which is not suited to the everyday user and of course is not portable. In addition their ability to improve reading speed was quite limited. As a result, these devices have been largely unsuccessful. Various types of controlled reading devices which unveil or illuminate portions of a line at times have also been proposed, but these were awkward, non-portable, expensive, and only effected limited reading improvement.

One of the more successful reading improvement methods has been the so called "speed-reading courses" wherein students are taught, by an instructor, to improve reading speed by moving their own finger or fingers across the lines of a printed page in sequence and forcing themselves to follow the "manual pointer" so as to effect an improvement in reading speed. While somewhat successful, this method of reading improvement is disadvantageous in that it requires the reader to constantly move his or her fingers across and down the printed page, which is physically awkward, tiring, and undesirable because it does not provide any means of quantifying the reading speed and since the reader must learn to "push" beyond an accustomed present reading speed by moving his or her fingers faster than a comfortable pace. Another disadvantage is that the reader's fingers are often soiled by ink from the newspaper or other printed page.

Accordingly several objects of the present invention are to provide a new and improved reading pacer, to provide a reading pacer which is portable, economical, and reliable, to provide a reading pacer which provides a means of quantifying reading speed; to provide a reading pacer which does not require awkward manual manipulation; and to provide a reading pacer in which the reader's hands are not soiled by ink from the printed page. Further objects and advantages of the invention will become apparent from consideration of the ensuing description thereof.

DRAWINGS

Figure 1B:
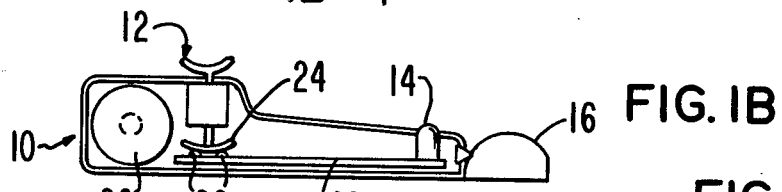
Figure 1C:
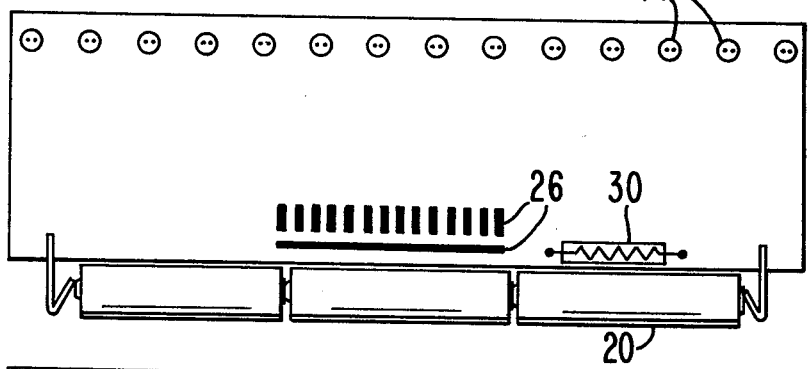
Figure 1D:
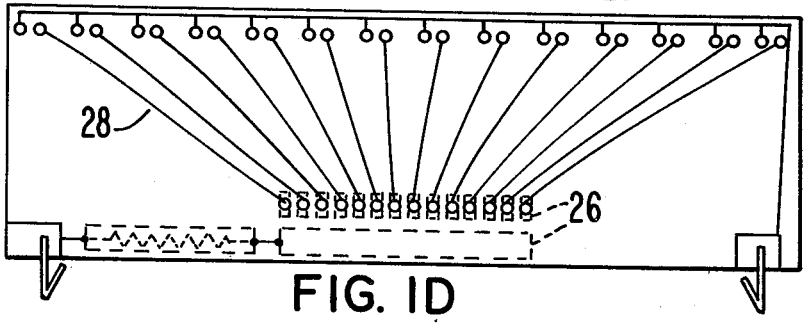
Figure 1E:
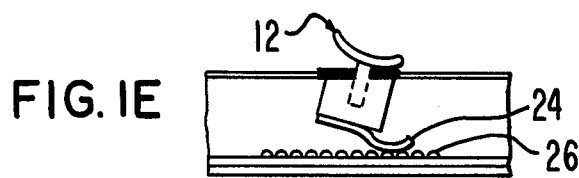

FIG. 1, parts A to E, show various views of a "manual" reading pacer in accordance with the invention, FIG. 1A being a top or plan view thereof, FIG. 1B being a side sectional view thereof, FIG. 1C being a top view of a printed circuit board thereof, FIG. 1D being a bottom view of said printed circuit board, and FIG. 1E being a back internal view of a switch thereof.

FIG. 2, parts A and B, show a back view of a different type of slide switch useable in the embodiment of FIG. 1 in two modes of operation, respectively.

Figure 3A:
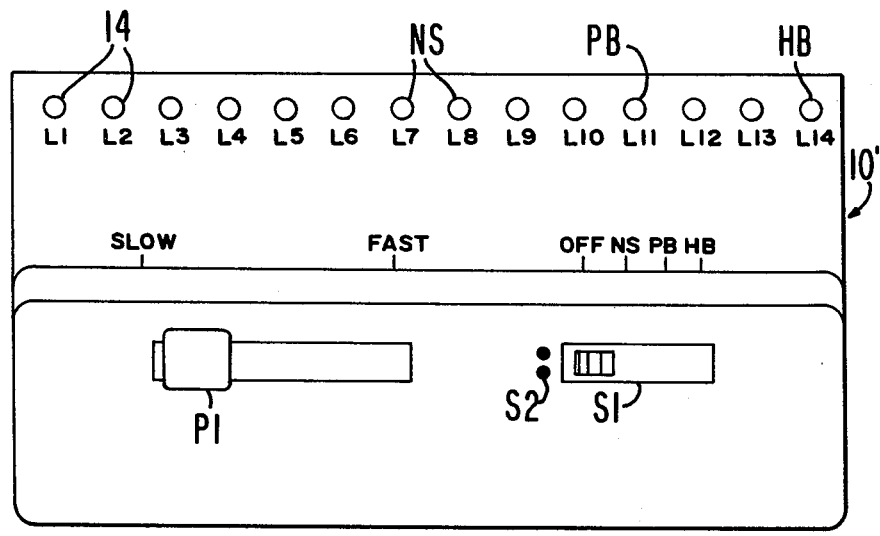
Figure 3B:
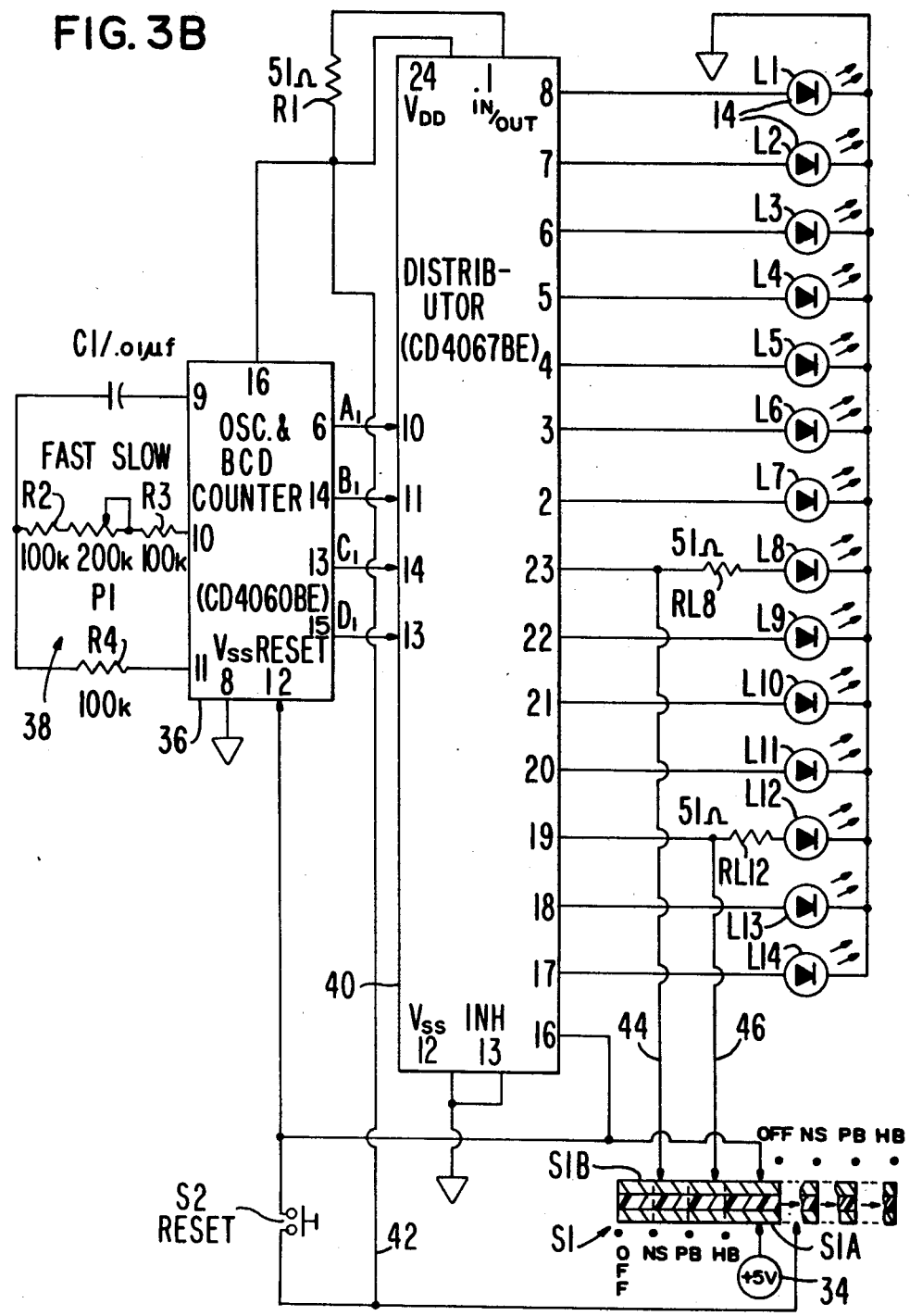

FIG. 3 shows an electronic version of the invention, FIG. 3A being a top view thereof and FIG. 3B being a schematic diagram of an electronic circuit thereof.

| Reference Numerals | | | |
|---|---|---|---|
| 10 | housing | 12 | slide switch |
| 14 | lamps | 16 | magnifier |
| 18 | slot | 20 | energy cells |
| 22 | PCB | 24 | wiper |
| 26 | PCB contacts | 28 | PCB traces |
| 30 | resistor | 32 | flexible wiper |
| 34 | voltage source | 36 | osc. & BCD ctr. |
| 38 | RC network | 40 | distributor |
| 42 | power lead | 44 | RL8 lead |
| 46 | RL11 lead | P1 | speed potentiometer |
| S1 | power/width | S2 | man. reset |
| R1, RL8, R111 | resistors | L1–L14 | LEDs |

FIG. 1—Manual Version

In the manual version of the invention, shown in FIG. 1, a box or housing 10 (FIGS. 1A and 1B) is provided with a slide switch 12 thereon and also a row of lamps 14 along a front edge thereof. An optional elongated magnifier lens of transparent plastic or glass 16 can be provided to snap into the front edge of housing 10 adjacent lamps 14.

In use, the reading pacer of FIGS. 1A and 1B, with or without magnifier 16, is placed under a row of print to be read, with its front edge (adjacent lamps 14) directly under said row of print. Then the user manually moves switch 12 from left to right along slot 18 in the top of housing 10. As switch is moved from left to right, lamps 14 will be illuminated (and extinguished) in sequence, starting from the left and ending at the right. When the user moves switch 12 back to the left, none of the lamps will be light, but when the user re-moves switch 12 from left to right again, lamps 14 will again illuminate in sequence from left to right.

Thus by repetitively moving switch 12 from left to right, while holding the front edge of the pacer under the respective lines to be read, lamps 14 will illuminate from left to right across the lines of print in order to pace reading of such lines at any desired speed. It is very easy to move switch 12 from left to right since movement through only a relatively small distance is required; such distance is substantially narrower than the width of the printed line. Also it is far easier to move switch 12 than to move one's finger(s) under the lines to be read.

As the lamps flash in sequence when switch 12 is moved across slot 18, the lamps will pace the reader's eyes across the line. Thus the reader need merely follow the moving light, in effect, and his or her eyes will be properly guided. By moving switch 12 at a fast enough speed to "push" the reader's speed beyond a normal or "lazy" speed, the reader will be able to effect an improvement in reading speed. Also the reading pacer is very useful for the visually impaired, elderly, or very young, who must use their finger to keep their place when reading a line. Instead of having to use a finger, the reader need merely place housing 10 under the line to be read and move slide switch 12 and the reading place will be paced in a much easier and better-indicated manner than with a finger.

Refering to FIG. 1B, which shows a cross sectional view of the interior of housing 10 taken along the lines 1B—1B of FIG. 1A, housing 10 contains a battery of three energy cells such as 20, a printed circuit board (PCB) 22, lamps 14 mounted aong the front edge of PCB 22 and extending through the upper surface of housing 10, a wiper contact 24 of slide switch 12, and contacts 26 on PCB 22.

As shown in FIG. 1C, contacts 26 comprise two rows, a bottom row with a solid strip contact and a top row comprising a series of separate contacts, each one leading to a respective one of lamps 14 via traces such as 28 (FIG. 1D) on the underside of PCB 22.

Switch 12 is tiltable so that when it is moved to the right, as shown in FIG. 1E, wiper contact 24 will be forced down to connect the solid strip (bottom row) of PCB contacts 26 to the separate contacts thereof (top row) and when switch 12 is moved to the left, switch 12 will be tilted in the opposite direction (not shown) so that wiper 24 will be lifted and will not interconnect any contacts of rows 26.

When wiper 24 interconnects any contacts of rows 26 together, energy will be conducted from cells 20 through a dropping resistor 30 to one of lamps 14 to illuminate said lamp. Thus as switch 12 is moved from left to right, energy from cells 20 will be distributed to said lamps in sequence, causing them to be illuminated in sequence.

Preferably cells 20 are of the "N" size, dropping resistor 30 has a value of about 240 ohms, and lamps 14 are LEDs. Housing 20 is preferably about 11.1 cm (4.4 in) wide in FIG. 1A, about 5.6 cm (2.2 in) wide in FIG. 1B without magnifier 16, and its height is about 1.6 cm (0.63 in) in FIG. 1B without the knob or handle of switch 12. Thus the device is sized conveniently for almost any line width of printed material and can easily be transported in one's pocket for convenient use. Row of lamps 14 contains fourteen lamps in a preferred embodiment, but it will be understood that more or less lamps can be used and the size of the device can be varied within wide limits.

Figure 2A:
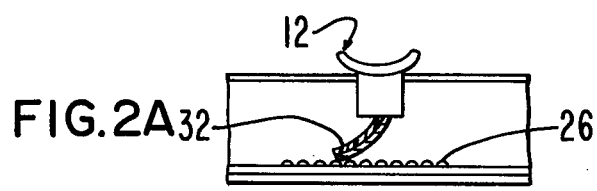
Figure 2B:
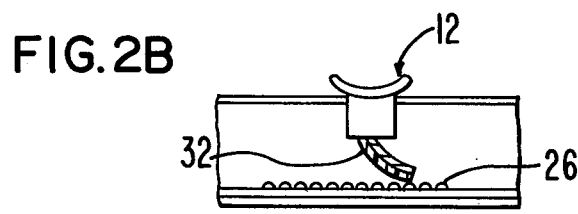

It will be apparent that many other methods can be used for effecting sequential illumination of lamps 14 in response to manual movement of slide switch 12 from left to right and back. Another scheme is shown in FIGS. 2, parts A and B, wherein switch 12 includes a flexible wiper 32 extending down from the exposed knob thereof. Wiper 32 is bilayered, the righthand layer being a conductive metal strip and the lefthand layer being an insulating strip of plastic, rubber, or the like. Both strips are bonded together to provide a flipable, flexible, wiper member. Thus when switch 12 is moved to the right, as shown in FIG. 2A, wiper 32 will flip and trail to the left so that the metal or conductive side thereof will engage and interconnect contacts 26 to illuminate lamps 14 in sequence. When switch 12 is moved to the left, as indicated in FIG. 2B, wiper 32 will flip and trail to the right so that the insulating side thereof will engage contacts 26, whereby no connections between contacts 26 will be effected and no lamps will light as switch 12 is returned to its leftmost and starting position.

In other embodiments of the manual version of the invention (not shown), switch 12 can be a slide potentiometer and lamps 14 can be arranged in circuit with successively higher voltage-rated Zener diodes so that they will be illuminated in sequence as the potentiometer is moved to the right. Also a voltage-responsive electronic distributor can be employed with manual switch 12 also being a potentiometer such that as switch 12 is moved to the right, a gradualy increasing voltage will cause the voltage responsive distributor to energize lamps 14 in sequence. Various other distribution arrangements will be envisioned by those skilled in the art.

FIG. 3—Electronic Version

The electronic version of the reading pacer, shown in top or plan view in FIG. 3A, comprises a housing 10' and a row of lamps, such as 14, similar to those of FIG. 1A. Housing 10 includes a potentiometer P1 thereon which can be moved from a slow to a fast setting or anywhere in between, and a switch S1 which is a combined power and line width switch. At its leftmost, or off position, no lamps will be illuminated. When S1 is moved to its first position from the leftmost position, i.e., to position "NS" (newspaper) the device will be turned on and lamps L1 to L7 inclusive will be illuminated and extinguished in sequence repetitively at a speed controlled by the position of potentiometer P1. The width of the row of lamps from L1 to L7 is about 4.8 cm (1.9 in), i.e., about the width of a newspaper column. After L7 is illuminated, a one-lamp delay will be provided and the sequencing will start again with L1.

When S1 is moved further to the right, to the PB (paperback) position, lamps L1 to L11 inclusive will be repetitively illuminated in sequence, thereby to provide a row of illuminating lamps of about 7.9 cm (3.1 in) in width, i.e., about the width of a line of print in a typical paperback book. Again a one-lamp delay will be provided before a new sequence is begun.

When S1 is moved all the way to the right to its HB (hardback position), all fourteen lamps will be illuminated, thereby to provide a row of illuminating lamps of about 10.2 cm (4 in) in width, i.e. about the width of a typical hardback book.

If the reader encounters a short line, e.g., at the end of a paragraph, the sequencing can be manually terminated by placing one's finger across contacts S2 so that the reader can proceed immediately to the next line.

Lamps 14 are spaced about 0.75 cm (0.3 in) between centers and a delay between sequencing of adjacent lamps can be adjusted from approximately 500 ms (P1 at left side) to about 1 s (P1 at right side). In the full width (HB) position, after the last lamp, L14, is illuminated, a two-lamp delay is provided to allow more time for the user to move the reading pacer down to the next line.

The electronic version of the invention provides automatic means of increasing reading speed since the setting of P1 can easily be adjusted to a position which "pushes" the reader beyond his or her normal level. To this end, P1 can be optionally calibrated (not shown) in an approximate indication of words per second if desired.

The electronic circuit employed within housing 10' is shown in FIG. 3B and comprises a 4.5 volt source or battery of cells 34, S1, which has two strips, S1A and S1B, a combined oscillator and BCD (binary-coded decimal) counter integrated circuit (IC) 36, a speed-controlling RC network 38, a distributor IC 40, a pair of resistors RL8 and RL12, LEDs L1 to L14, a dropping resistor R1, and a manual reset switch or contacts 52.

In operation, when S1 is moved from its off position, as shown in FIG. 3B, to any of its operating positions (NS, PB, or HB), its bottom conductive strip S1A connects source 34 to power supply lead 42, thereby energizing IC's 36 and 40. IC 36, a type CD4060BE manufactured by RCA Corp, provides BCD output count at its four output leads A, B, C, and D in order to provide a BCD count input to distributor 40.

The speed of operation of the output of IC 36 is controlled by network 38, which comprises a capacitor C1, potentiometer P1, and resistors R2, R3, and R4, with C1 and R4 being connected in series between terminals 9 and 11 of IC 36. R2, P1 and R3 are connected in series bewteen the junction of C1 and R4 and terminal 10 of IC 36.

In response to the BCD input count from IC 36, distributor 40 will tend to energize lamps L1 to L14 in sequence. However if S1 is in its first position, i.e., the NS position, only lamps L1 to L7 will be energized. This is because as soon as output terminal 23 of IC 40 is energized, a voltage drop will be provided across resistor RL8, providing a voltage on lead 44 which will be conducted, via top conductive strip S1B, to the reset input terminal, numbered 12, of IC 36, thereby resetting IC 36 so as to cause it to provide a zero count and stop further distribution to successive lamps of lamps 14. After a one-lamp delay provided by IC 40, the count starts over again, beginning with L1.

If S1 is moved further to the right, i.e., to the PCB position, the lamps up to and including L11 will be energized in sequence since conductive strip S1B will be moved far enough to the right to isolate lead 44. When L11 is energized, a voltage will be developed across RL11 and this voltage will be sent, via lead 46 and conductive strip S1B, to reset terminal 12 to reset and restart the sequencing action.

If S1 is moved all the way to the right, i.e., to the HB position, both leads 44 and 46 will be removed from the reset circuit and thus all lamps (L1 to L14) will be illuminated in sequence. After L14 is illuminated, distributor 40 will energize its last sequence terminal 16 and this energization will be directly transmitted back to reset terminal 12 of counter 36 to reset the counter and restart the sequencing after a two-lamp delay provided between the energization of L14 and terminal 16 and the operation of IC.

By interconnecting contacts 52 with one finger, or by operating a momentary SPST switch as shown, the device can be reset at any time since operation of S2 will connect source 34 directly to reset terminal 12.

Distributor 40 is a type CD4067BE manufactured by RCA Corp. Its other terminals are connected as shown, i.e., its terminals 12 and 13 (Vss and Inh) are joined together and connected to ground, i.e., to the other side of power supply 34. Its input terminals 10, 11, 13, and 14 are connected to the BCD output terminals of counter 36, its VDD terminal 24 is connected directly to source 34 via S1, and its In/Out terminal 1 is connected to its terminal 24 via dropping resistor R1.

RAMIFICATIONS

Although the invention has been shown as a sequencer for a row of lamps, it will be apparent that many other ramifications are possible within the scope of the invention. For example in lieu of a row of lamps, a strip of light which continually repetitively increases in length may be provided, the lamps, instead of illuminating in sequence briefly can be illuminated in sequence and left on until reset occurs, the lamps can be provided on the edge of housing 10 where magnifier 16 is positioned rather than on the top of housing 10, so that the lamps will actually illuminate the words being read. The color of lamps used is preferably red, but green, blue, yellow, or even white (incandescent) lamps can be alternatively be used. Also in lieu of lamps, LCD (Liquid Crystal Display) devices can be provided. These can be "illuminated" (made dark or opaque in sequence, or vice-versa, or all can initially be made dark (or transparent) and then be made and left successively transparent (or dark) so as to provide a "lengthening line" effect. Various other ramifications and modifications will occur to those skilled in the art. Accordingly the full scope of the invention should not be determined by the examples given, but by the appended claims and their legal equivalents.

I claim:

1. A reading pacer comprising a portable, hand-holdable housing having visible indication means along one edge thereof, said visible indication means being arranged to provide a visible output which can move along said edge in a given direction at a predetermined speed, and driver means within said housing for controllably causing said visible indication means to provide said visible output which moves along said edge at said predetermined speed, said driver means comprising an energy source and an electronic circuit within said housing, said visible indication means comprising a row of lamps mounted in said housing, said electronic circuit being arranged to energize said lamps in sequence, said electronic circuit also containing means for controlling the speed by which said lamps are energized in sequence, and means for controlling the number of lamps in said row which are energized in every cycle of sequential energization of said lamps, said means comprising a switch having a plurality of different settings for respectively different column widths of line printing.

2. A reading pacer comprising a portable, hand-holdable housing having visible indication means along one edge thereof, said visible indication means being arranged to provide a visible output which can move along said edge in a given direction at a predetermined speed, and driver means within said housing for controllably causing said visible indication means to provide said visible output which moves along said edge at said predetermined speed, said driver means comprising an energy source and an electronic circuit within said housing, said visible indication means comprising a row of lamps mounted in said housing, said electronic circuit being arranged to energize said lamps in sequence, said electronic circuit also containing means for controlling the speed by which said lamps are energized in sequence, said electronic circuit comprising a controllable frequency oscillator and a distributor for distributing energy pulses to said respective lamps of said row in sequence and in synchronism with the output of said oscillator.

3. The pacer of claim 2 wherein said distributor comprises controllable reset means for re-energizing said row of lamps in sequence upon energization of one a selected plurality of said lamps, thereby to control the number of said lamps which are energized in each cycle of energization.

4. A reading pacer comprising a portable, hand-holdable housing having visible indication means along one edge thereof, said visible indication means being arranged to provide a visible output which can move along said edge in a given direction at a predetermined speed, and driver means within said housing for controllably causing said visible indication means to provide said visible output which moves along said edge at said predetermined speed, said driver means comprising an energy source and an electronic circuit within said housing, said visible indication means comprising a row of lamps mounted in said housing, said electronic circuit being arranged to energize said lamps in sequence, said electronic circuit also containing means for controlling the speed by which said lamps are energized in sequence, said electronic circuit further containing means for controlling the number of lamps in said row which are energized in every cycle of sequential energization of said lamps.

* * * * *